Figure 1:
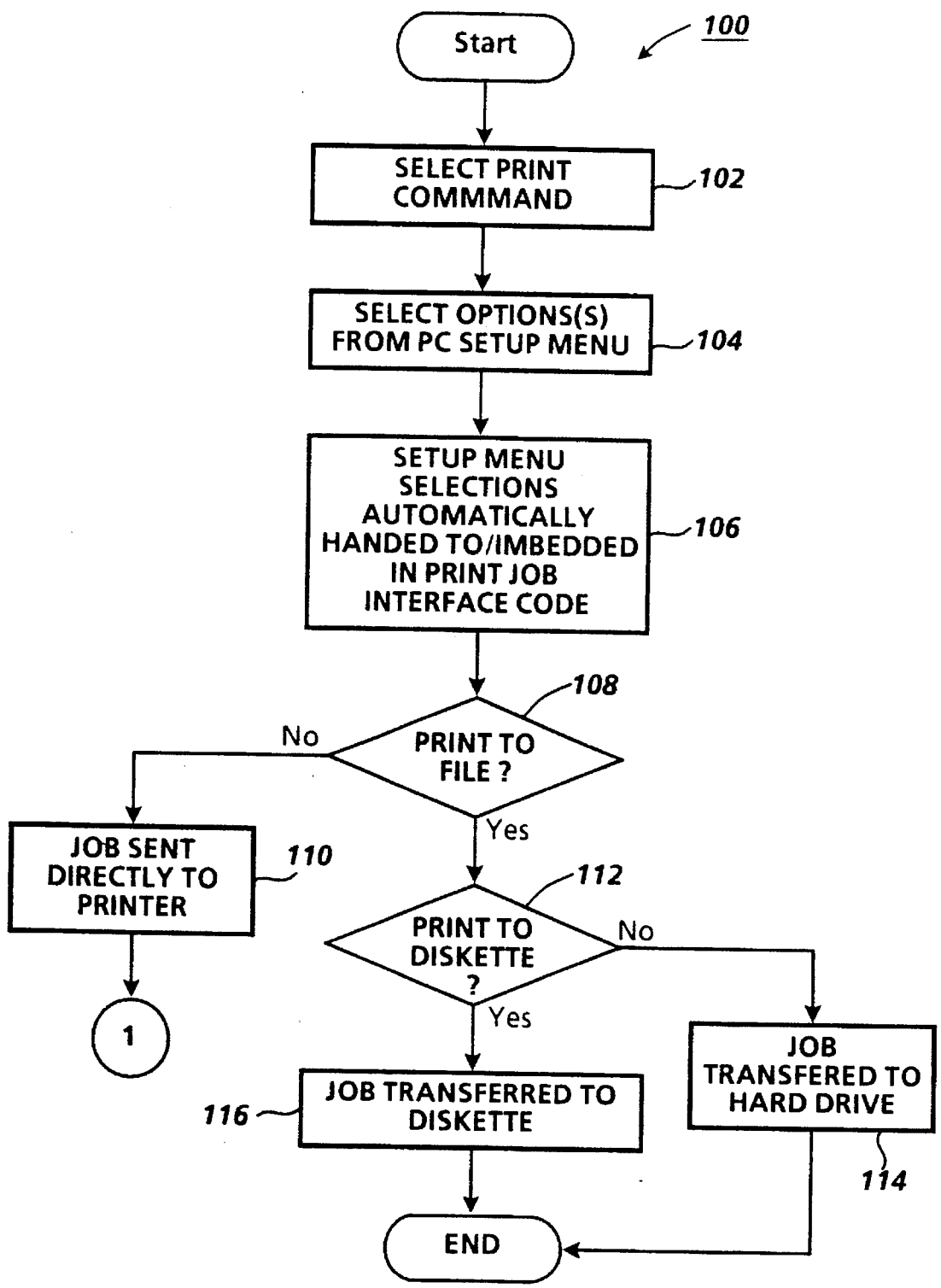

United States Patent [19]

Ta et al.

[11] Patent Number: 5,500,715
[45] Date of Patent: Mar. 19, 1996

[54] PRINT JOB HANDLING MENU SELECTION APPARATUS AND METHOD

[75] Inventors: Luong N. Ta; Robert J. Pesar; Walter F. Wafler, all of Rochester, N.Y.

[73] Assignee: Xerox Corporation, Stamford, Conn.

[21] Appl. No.: 253,455

[22] Filed: Jun. 3, 1994

[51] Int. Cl.$^6$ .................................................. G03G 21/00
[52] U.S. Cl. ........................ 355/204; 355/200; 355/210; 355/244
[58] Field of Search ................................. 355/200, 202, 355/204, 209, 210, 244; 358/403, 406, 452, 448, 460, 462, 468, 467, 300; 364/225.4, 225.6, 226, 235, 246.1, 920.7, 930, 943, 943.1

[56] References Cited

U.S. PATENT DOCUMENTS

| | | | |
|---|---|---|---|
| 4,167,324 | 9/1979 | Wu | 355/244 X |
| 4,939,670 | 3/1990 | Freiman et al. | 364/519 |
| 4,992,827 | 2/1991 | Kobayashi et al. | 355/202 |
| 5,045,880 | 9/1991 | Evanitsky et al. | 355/209 X |
| 5,095,369 | 3/1992 | Ortiz et al. | 358/296 |
| 5,129,639 | 7/1992 | DeHority | 270/1.1 |
| 5,175,679 | 12/1992 | Allen et al. | 364/148 |
| 5,200,830 | 4/1993 | Imaizumi | 358/296 |
| 5,235,680 | 8/1993 | Bijnagte | 395/161 |
| 5,251,297 | 10/1993 | Takayanagi | 395/164 |
| 5,260,742 | 11/1993 | Kikkawa | 355/202 |
| 5,267,049 | 11/1993 | Yamamoto | 358/406 |
| 5,278,611 | 1/1994 | Ito et al. | 355/202 |
| 5,281,998 | 1/1994 | Douglas et al. | 355/202 |
| 5,384,620 | 1/1995 | Ebner et al. | 355/202 |

OTHER PUBLICATIONS

The Xerox 5775 Digital Copier/Printer with the EFI Fiery Controller of the EFI Fiery Lite Controller dated Jan. 1993.

*Primary Examiner*—Matthew S. Smith
*Attorney, Agent, or Firm*—Don L. Webber

[57] ABSTRACT

An apparatus and method for assembling printing option menu selections to form a final set of printing instructions for a print job. A printer user interface accepts a first set of printing instructions, while a printer port accepts a computer generated storage media having a print job including a second set of printing instructions embedded therein. A processor maintains a default set of printing instructions at the printer. A processor combines the first set of printing instructions, the second set of printing instructions and the default set of printing instructions so as to compile the final set of printing instructions for completing the print job. The printing instructions may be compiled so as to prioritize the printing instructions in a desired manner. The user interface may display the various set of printing instructions, and warn printer users when conflicts arise between the instructions.

24 Claims, 4 Drawing Sheets

PRINT JOB HANDLING MENU SELECTION APPARATUS AND METHOD

The present invention relates to a job handling system for printers, and more particularly, to an apparatus and method for selecting printer setup menu options which override both menu selections embedded in a print file on a diskette by a computer and printer default menu settings.

In the process of electrostatographic printing, an electrostatic charge pattern or latent image corresponding to an original or electronic document to be produced is recorded on an insulating medium. A viewable record is produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. The toner image is transferred to a sheet and fixed (or fused) thereto.

In the operation of printers, to include those capable of producing color output prints, it is highly desirable to have means for selecting the various possible printing options at a computer (hereinafter, a "PC") that may also be used to create or modify the printing options of the electronic document to be printed. A print job may be created using the PC, and embedded or coupled with a set of printing features, setup options or output attributes selected from a menu. The print request, to include such attributes as the number of copies and other selections, may be sent electronically over a network or directly to a printer. In addition, the print job may be stored in a hard drive in the printer, or on a diskette, magnetic tape, read/write optical disc, or other portable/removable storage media. It is desirable to enable a printer and PC users to modify the setup menu selections of a job at the printer when a diskette or other portable storage media including the job is inserted into the printer. Further, it is also desirable to utilize a system to execute the print job according to a system permitting the menu selections of the job to be prioritized, such that the users menu selections made at the printer override PC embedded selections as well as and printer default settings. In certain applications, it may be desirable to modify the diskette to reflect the selections made at the printer; in other applications, it may be desirable to maintain the embedded menu selections entered using the PC, so that the job is printed only once according to the printer menu selections. The printer menu selections may include all, some and/or additional menu selections as compared to the printer default settings and/or the PC menu selections. In certain embodiments, the system may deconflict the various menu selections/settings automatically, and or warn the user that such conflicts exist prior to printing the job.

The printing and menu selection activities outlined above are just a few of the many alternatives and feature selections to be desirably performed by a system that permits timely and efficient execution of print jobs according to a flexible, feature rich, yet easy to use prioritizing print job handling system.

The following disclosures may be relevant to various aspects of the print setup menu selection/handling system of the present invention:

U.S. Pat. No. A-5,281,998
Patentee: Douglas et. al.
Issued: Jan. 25, 1994

U.S. Pat. No. A-5,235,680
Patentee: Bijnagte
Issued: Aug. 10, 1993

U.S. Pat. No. A-5,175,679
Patentee: Allen et. al.
Issued: Dec. 29, 1992

U.S. Pat. No. A-5,129,639
Patentee: DeHority
Issued: Jul. 14, 1992

U.S. Pat. No. A-5,095,369
Patenettt: Ortiz et. al.
Issued Mar. 10, 1992

U.S. Pat. No. A-4,939,670
Patentt: Freiman et. al.
Issued: Jul. 3, 1990

Xerox 5775 Digital Color Copier/Printer with the EFI Fiery Controller User Guide, dated January, 1993

U.S. Pat. No. A-5,281,998 discloses a system for providing a memory for storing electronic images and an associated job scheduling method. The stored images have color mode marks and a control for providing images in optional color modes for producing a set of images with discrete elements of the set of images. The images are processed in a selected color mode independent of the color mode other elements, by identifying elements of the set of images with color code marks and responding to the color code marks to alter the operation of the machine dependent upon the identified color mode mark. The job scheduling method disclosed may be performed on any job requirement received by a printer, to schedule any combination of job sheets. Each of the sheets could have discrete print characteristics or operating modes. To give specific requirements to specific job sheets, mode change requests are received from a controller.

U.S. Pat. No. A-5,235,680 discloses a system and method for storing, retrieving displaying, printing and otherwise manipulating color images stored in a central computer from a remote data terminal The centralized computer can store image information on an interactive basis, for display, printing, or storage on a storage medium associated with the remote display terminals.

U.S. Pat. No. A-5,175,679 discloses a realtime print control process in which background and job requests are dynamically partitioned. A compressed image data is stored in and accessed from main memory; the image may be processed, displayed on a screen or provided to a printer from the main memory. When further processing is required, the image data may be transferred to an image manipulation section, where the additional processing steps such as collation, make ready, decomposition, etc. are carried out. Following processing, the data may be returned to main memory, sent to a screen for display, or sent to image output (print) controller.

U.S. Pat. No. A-5,129,639 discloses a system which compares print job requirements to printer capabilities, and determines the best match to be made between these requirements and capabilities. When a mismatch occurs, the system determines the best match between size, color, weight and type by determining a mismatch magnitude.

U.S. Pat. No. A-5,095,369 discloses printing and collating of sets of original scanned documents are controlled so that collated sets are successively presented by the printer to the finisher nearly coincident with conclusion of the finishing activity being accomplished for a current job. Additional software innovations allow for scheduling of jobs. A method of operating an electronic printer in a multi-job streaming mode is also disclosed, and may include programming the printer with printing and finishing instructions for each job, scanning document pages of several jobs and converting the scanned pages into electronic pages, combining the electronic pages of each job with printing and finishing instructions to provide job files for each of said jobs, storing said job files in memory pending printing and other aspects.

U.S. Pat. No. A-4,939,670 discloses a personal computer (PC) running on MS/DOS interactively and graphically creates or modifies definitions for print fonts, electronic forms, page compositions and sketches and includes a function for converting the definitions for transfer to a mainframe computer facility for use by the mainframe printer control function and printer. Menus are used to employ the various options that may be selected in manipulating and printing documents.

The Xerox 5775 Digital Color Copier/Printer with the EFI Fiery Controller User Guide discloses the use of a network controller/server which sends print jobs to a color printer/copier. The print jobs may be loaded into the controller using a diskette. While the electronic document to be printed in the color printer cannot be composed on the controller, the controller can be used to enter printing instructions to be sent to the color printer for execution.

In accordance with one aspect of the present invention, there is provided an apparatus for assembling printing option menu selections to form a final set of printing instructions to a printer for a print job. The apparatus includes a first means for accepting a first set of printing instructions, a second means for accepting a second set of printing instructions and a processor for maintaining a default set of printing instructions at a printer. The processor is associated with the first accepting means and the second accepting means to combine the first set of printing instructions, the second set of printing instructions and the default set of printing instructions so as to compile the final set of printing instructions for completing the print job.

In accordance with another aspect of the present invention, there is provided a printing system adapted to print indicia on sheets including a system for assembling printing option menu selections to form a final set of printing instructions to a printer for a print job. The system includes a first means for accepting a first set of printing instructions, a second means for accepting a second set of printing instructions and a processor for maintaining a default set of printing instructions at a printer. The processor is associated with the first accepting means and the second accepting means to combine the first set of printing instructions, the second set of printing instructions and the default set of printing instructions so as to compile the final set of printing instructions for completing the print job.

In accordance with another aspect of the present invention, there is provided a method for assembling printing option menu selections to form a final set of printing instructions to a printer for a print job. The method includes the steps of entering a first set of printing instructions on a printer user interface, obtaining a second set of printing instructions, obtaining a default set of printing instructions and compiling the first set of printing instructions, the second set of printing instructions and the default set of printing instructions to form the final set of printing instructions for completing the print job.

Figure 2:
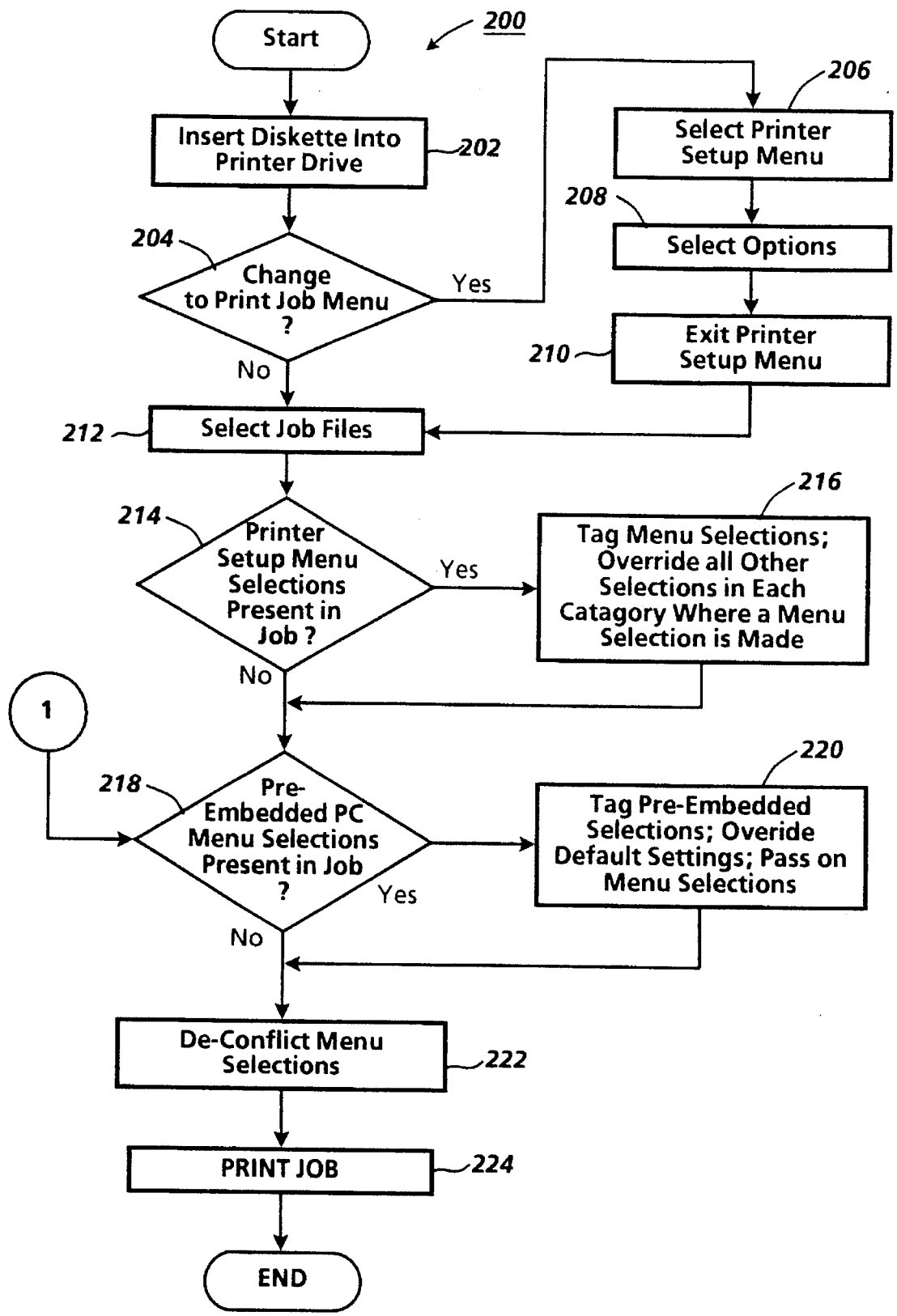
Figure 3:
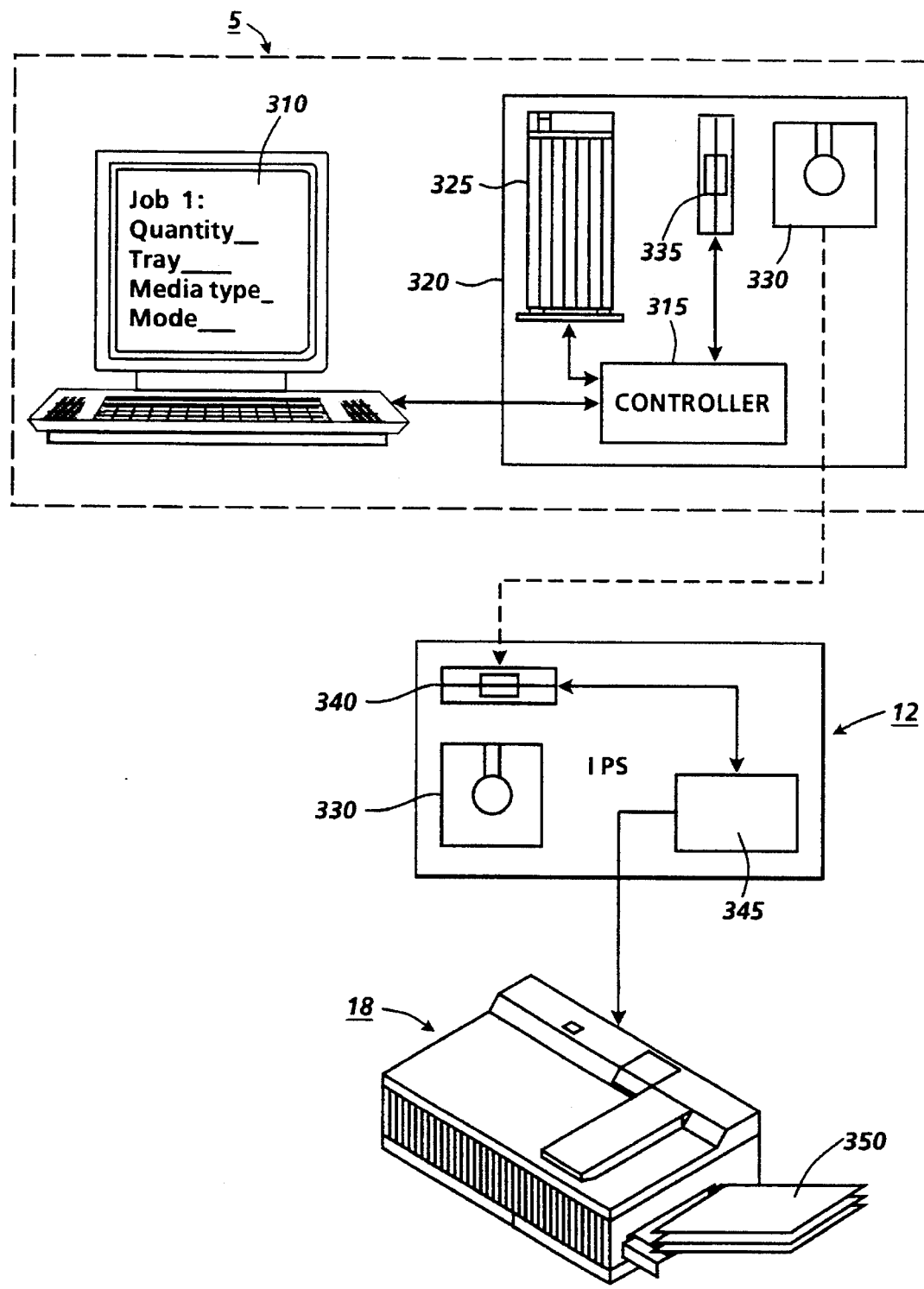
Figure 4:
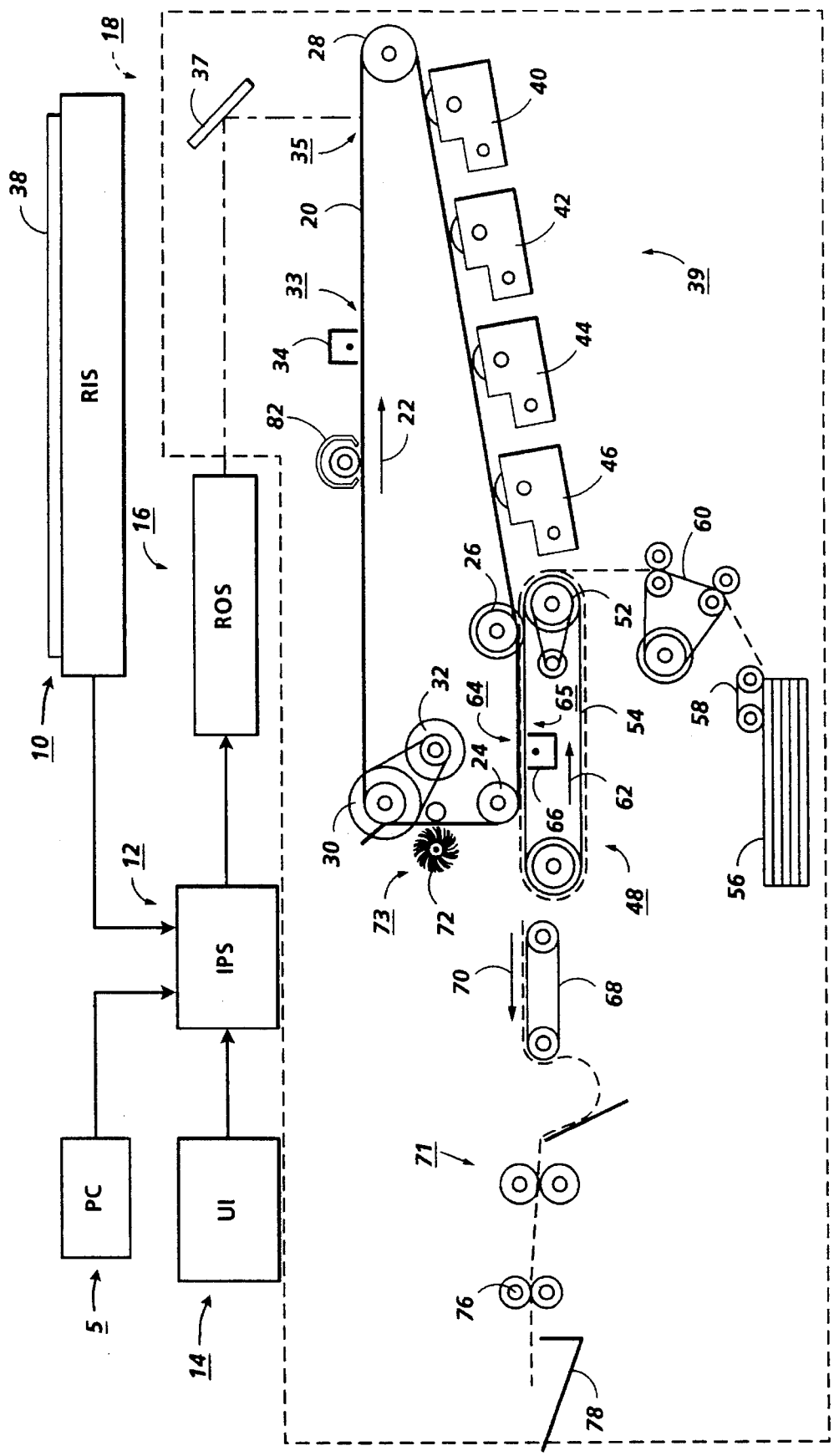

Other features of the present invention will become apparent as the following description proceeds and upon reference to the drawings, in which:

FIG. 1 is a flowchart diagram showing one embodiment of a PC print job menu selection system of the present invention;

FIG. 2 flowchart diagram showing one embodiment of a printer menu selection system of the present invention FIG. 3 is a block diagram showing further aspects of a printer and PC system incorporating features of the present invention therein; and FIG. 4 is a schematic elevational view showing an exemplary electrophotographic printing machine and PC incorporating features of the present invention therein.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

For a general understanding of the features of the present invention, reference is made to the drawings. FIG. 4 is a schematic elevational view showing an exemplary electrophotographic printing machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. While the present invention will hereinafter be described in connection with preferred embodiments, it will be understood that it is not intended to limit the invention to a particular embodiment. On the contrary, it is intended to cover all alternatives, modifications and equivalents as may be included within the spirit and scope of the invention as defined by the appended claims.

To begin by way of general explanation, FIG. 4 is a schematic elevational view showing an electrophotographic printing machine and networked PC which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 4), as well as display all or certain print menu selections and other relevant information in accordance with the present invention as described in association with FIGS. 1 through 3 below.

As further shown in FIG. 4, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly and/or directly to PC 5.

Digitized electronic documents may be created, modified, stored and/or otherwise processed by PC 5 prior to transmission/relay to IPS 12 for printing on printer 18. The display of PC 5 may show electronic documents on a screen (not shown in FIG. 4). The screen of PC 5 may also display and interface with the IPS 12 processor(s) and controller(s), diskette drives and other components (as shown in FIG. 3) to include those managing relevant print menu information in accordance with the present invention as described in association with FIGS. 1 through 3 below.

IPS 12 also may transmits signals corresponding to the desired electronic or scanned image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 4, printing or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 4) extends between belts 54 and moves in unison therewith. A sheet 25 is advanced from a stack of sheets 56 disposed on a tray. A friction retard feeder 58 advances the uppermost sheet from stack 56 onto a pret-ransfer transport 60. Transport 60 advances the sheet (not shown in FIG. 4) to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (again, not shown in FIG. 4) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. A variety of sensors (not shown in FIG. 9) may be incorporated into the fuser to indicate fuser oil levels, service/maintenance requirements and a variety of other aspects of fuser operation as described in greater detail in association with FIGS. 1 through 8 below. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

FIG. 1 shows a representative block diagram of system 100 PC print menu selection functions. To initiate the PC menu selection function, according to print jobs that may be included on a PC, the user selects the "Print" command in association with a job , as shown by block 102. Thereafter, according to block 104, the user selects the desired and/or relevant options from the P setup menu, in preparing to obtain the desired print output. The options in the PC setup menu can (such as shown in the FIG. 3 display screen 310 of PC 5) can vary widely according to the particular application. Menu features may include parameters such as: the quantity of prints to be made; a selection of print resolutions (such as dots per inch); the sheet media type (such as plain paper, label stock, transparency, etc.) to be used; color mode selections (pictorial, graphics, color, grayscale, black and white, etc.); sheet tray switching; slip sheet insertion tray selection; print mode selections (such as for PostScript jobs (a mark registered to Adobe Systems Inc.), Encapsulated PostScript jobs, PCL5 emulator jobs, automatically selected jobs); and numerous other features. Other PC setup parameters or options also may include print sheet orientation (landscape, etc.); the tray sheets are to be drawn from for printing; the number of prints/copies to be made; enlargement/reductions; color modifications; font types; and other selections. Once the PC setup menu selections are made, they may thereafter be automatically handed to, embedded in and/or coupled with the print job interface code as shown in block 106.

With continued reference to FIG. 1, according to decision block 108, the user may then select the "Print to File" option, and thereafter exiting the PC setup menu. If the "Print to File" option is not selected, in the case of a PC connected to a printer via an electronic connection, network or other means, the job may be forwarded to the printer for printing according to block 110. (See continuation of job to system 200 described in association with FIG. 2, as indicated by the circled flow chart continuation number 1 found in FIGS. 1 and 2.) If the "Print to File" option is selected, the user may elect to print (copy or move) the job to a diskette (decision block 112) so as to transfer the job to a diskette or other portable electronic storage media (block 116) or to a hard drive (block 114) if the print job to diskette option is not selected. A variety of portable storage media may be used in lieu of a diskette, to include a read/write optical disk, a memory card, a magnetic tape, or other data storage device or member, without departing from the spirit and scope of the present invention. If the print job is copied or moved to the hard drive as shown in block 114, it may be accessed for network printing, later transferred to a diskette, or merely stored and/or saved for subsequent use.

FIG. 2 shows a flow chart of system 200 of the present invention, in which the print job is handled according to the PC setup menu, printer setup menu and default menu setup. According to block 202, once printing the job is initiated, the job (with the embedded PC setup menu) is loaded selections into the printer by inserting the diskette into a printer disk drive (such as in drive 335 of IPS 12, as shown and described in conjunction with FIG. 3). If changes to the PC setup menu (or default printer menu, as discussed below) are desired according to decision block 204, the user is able to access the printer setup menu (block 206), chose from among or make no choices to the printer setup menu (block 208), and thereafter exit the printer setup menu(block 210). In differing embodiments of the present invention, the printer setup menu options of block 208 may include each of the PC setup menu options of block 104 of FIG. 2, some of the PC setup menu options, or even some menu choices not found in the PC setup menu options. Once the printer menu option selections are made, (or even if no changes are made according to decision block 214), the various job files to which the printer setup menu is to be applied are selected, according to block 212. In other embodiments of the present invention, the print job(s) to which printer setup menu options are to be applied may be selected before the printer setup menu option selections are made (such as may be illustrated by placing block 212 of FIG. 2 between blocks 202 and 204).

According to decision block 214, the printer processor (such as processor 345 of IPS 12, later described in conjunction with FIG. 3) then automatically determines whether printer setup menu selections are present in the job. If printer setup menu selections are present, the menu selections are automatically tagged by the printer processor so as to override all other menu selections (PC menu selections and printer default settings) according to block 216. As the "priority 1" menu selections, the printer setup menu selections are handled by the processor so as to permit a user to take a print job stored on a diskette, and to modify the menu selections of that job at the printer, without returning to the PC to alter the job, using a printer network controller or server to make changes to the menu, or other procedures that might require additional hardware or software, additional job processing/uploading/downloading or data processing and manipulation (and delays), or other steps or procedures that reduce printing (and operator) efficiency and cost savings.

With continued reference to FIG. 2, according to decision block 218, the printer processor then automatically determines whether PC setup menu selections are present in the job (to include for those jobs sent directly from the PC to be printed according to block 110 of FIG. 1). If pre-embedded PC setup menu selections are present, these menu selections are automatically tagged by the printer processor so as to override the printer default settings but not the printer setup menu selections, according to block 220. As the "priority 2" menu selections, the PC setup menu selections are handled by the processor so as to permit a user to employ a set of new printer setup menu choices during a one-time printing of the job, without changing the print job stored on a diskette. At the same time, the user need not have entered all required (or possible) print selections in the PC or printer setup menus; the printer may already include a set of "priority 3" default menu settings, (such as, for example, a single print in the autoselect mode, printed on plain paper from tray 1, and so on). System 200 of the present invention permits users to modify the various menu selections of that job at the printer, without returning to or altering the diskette at a PC or printer network controller/server to alter the diskette.

All printer menu setup selections, PC menu setup selections not overridden by the printer menu setup selections and printer default settings not overridden by the printer menu setup selections or PC menu setup selections are passed on to (optional) block 222, where they are deconflicted (such as for selection of a tray having sheets other than the selected sheet size, or similar resolvable conflict). In various embodiments of the present invention, apparent or system determined unresolved conflicts may be resolved so as to honor the priority (1, 2 or 3) of the menus/settings, shifted to applicable printer default settings, or otherwise manipulated according to a particular desired application. In other embodiments of system 200 including (or excluding) a menu conflict resolution feature, the user may be warned by an audible and/or visible alerting feature at the printer or at the PC (not shown in FIG. 2) that a menu conflict exists. Thereafter, according to block 224, the job is printed. In certain embodiments of the present invention, the printer default menu selections may be entered into the diskette, so as to alter the PC menu selections previously embedded in the job on the diskette. In this manner, each subsequent print request of the job from the diskette will show these altered menu selections as the PC menu selections. The relevant operations of system 200 of the present invention as shown in FIG. 2 are thus completed.

FIG. 3 shows a block schematic diagram of a PC and printer (including the IPS and print engine such as shown in FIG. 4) used to employ systems 100 and 200 as described in conjunction with FIGS. 1 and 2 above. Display screen 310 of PC 5 is shown with a set of PC menu selection options displayed thereon. Display screen 310 is used to display the various operations that may be performed by the electronic system 320 of PC 5. The various PC menu selections available may by controller 315 be copied/moved to diskette 330 in PC diskette drive 335 and/or hard drive 325 of electronic system 320. Electronic system 320 of PC 5 may perform tasks including those described in conjunction with system 100 as shown in FIG. 1. With continued reference to FIG. 3, a user may load diskette 330 into a drive 340 included with or connected to IPS 12. Processor 345 of IPS 12 may perform tasks including those described in conjunction with system 200 as shown in FIG. 2, to include sending jobs to print engine 18 of the printer.

While present invention has been described in conjunction with various embodiments set forth above, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An apparatus for assembling printing option menu selections to form a final set of printing instructions to a printer for a print job, comprising:

a first means for accepting a first set of printing instructions;

a second means for accepting a second set of printing instructions; and a processor for maintaining a default set of printing instructions at a printer, said processor being associated with said first accepting means and said second accepting means to combine the first set of printing instructions, the second set of printing instructions and the default set of printing instructions so as to compile the final set of printing instructions for completing the print job.

2. The apparatus of claim 1, whereby said processor compiles the final set of printing instructions according to a prioritized instruction sequence consisting of:

the first set of printing instructions;

the second set of printing instructions; and the default set of printing instructions.

3. The apparatus of claim 1, wherein said first accepting means comprises a user interface including a screen for displaying the first set of printing instructions, the second set of printing instructions and the default set of printing instructions.

4. The apparatus of claim 3, wherein said screen displays a conflict between the first set of printing instructions, the second set of printing instructions and the default set of printing instructions.

5. The apparatus of claim 1, wherein said processor further comprises a storage media for retaining printing instructions, whereby said processor is adapted to overwrite said second set of printing instructions on said storage media with said first set of instructions.

6. The apparatus of claim 1, wherein said second accepting means comprises a diskette with said processor being adapted to load the second set of printing instructions embedded with the print job on the diskette.

7. The apparatus of claim 1, wherein the first set of printing instructions, the second set of printing instructions and the default set of printing instructions include a collection of printing parameters selected from the group consisting of: a quantity of print parameters, a print resolution parameter, a sheet media selection parameter, a color selection parameter, a sheet tray parameter, a print mode parameter, a print sheet orientation parameter; an image size parameter, and a font selection parameter.

8. The apparatus of claim 7, wherein the second set of printing instructions comprises printing parameters excluding printing parameters of the first set of printing instructions.

9. A printing system adapted to print indicia on sheets including a system for assembling printing option menu selections to form a final set of printing instructions to a printer for a print job, said system comprising:

a first means for accepting a first set of printing instructions;

a second means for accepting a second set of printing instructions; and a processor for maintaining a default set of printing instructions at a printer, said processor being associated with said first accepting means and said second accepting means to combine the first set of printing instructions, the second set of printing instructions and the default set of printing instructions so as to compile the final set of printing instructions for completing the print job.

10. The printing system of claim 9, whereby said processor compiles the final set of printing instructions according to a prioritized instruction sequence consisting of:

the first set of printing instructions;

the second set of printing instructions; and the default set of printing instructions.

11. The printing system of claim 9, wherein said first accepting means comprises a user interface including a screen for displaying the first set of printing instructions, the second set of printing instructions and the default set of printing instructions.

12. The printing system of claim 11, wherein said screen displays a conflict between the first set of printing instructions, the second set of printing instructions and the default set of printing instructions.

13. The printing system of claim 9, wherein said processor further comprises a storage media for retaining printing instructions, whereby said processor is adapted to overwrite said second set of printing instructions on said storage media with said first set of instructions.

14. The sprinting system of claim 9, wherein said second accepting means comprises a diskette with said processor being adapted to load the second set of printing instructions embedded with the print job on the diskette.

15. The printing system of claim 9, wherein the first set of printing instructions, the second set of printing instructions and the default set of printing instructions include a collection of printing parameters selected from the group consisting of: a quantity of prints parameter, a print resolution parameter, a sheet media selection parameter, a color selection parameter, a sheet tray parameter, a print mode parameter, a print sheet orientation parameter; an image size parameter, and a font selection parameter.

16. The printing system of claim 15, wherein the second set of printing instructions comprises printing parameters excluding printing parameters of the first set of printing instructions.

17. A method for assembling printing option menu selections to form a final set of printing instructions to a printer for a print job, comprising:

entering a first set of printing instructions on a printer user interface;

obtaining a second set of printing instructions;

obtaining a default set of printing instructions; and compiling the first set of printing instructions, the second set of printing instructions and the default set of printing instructions to form the final set of printing instructions for completing the print job.

18. The method of claim 17, wherein said compiling step comprises compiling the final set of printing instructions according to a prioritized instruction sequence consisting of:

the first set of printing instructions;

the second set of printing instructions; and the default set of printing instructions.

19. The method of claim 17, comprising:

displaying the first set of printing instructions, the second set of printing instructions and the default set of printing instructions on a user interface screen.

20. The method of claim 19, comprising:

displaying a conflict between the first set of printing instructions, the second set of printing instructions and the default set of printing instructions on the user interface screen.

21. The method of claim 17, further comprising:

overwriting the second set of printing instructions on a storage media with the first set of printing instructions.

22. The method of claim 17, further comprising:

loading the second set of printing instructions onto a diskette storage media.

23. The method of claim 17, further comprising:

collecting a set of printing parameters for inclusion in the first set of printing instructions, the second set of printing instructions and the default set of printing instructions, with the set of printing parameters being selected from a group consisting of: a quantity of prints parameter, a print resolution parameter, a sheet media selection parameter, a color selection parameter, a sheet tray parameter, a print mode parameter, a print sheet orientation parameter; an image size parameter, and a font selection parameter.

24. The method of claim 17, whereby the final printing instructions are compiled such that the second set of printing instructions excludes printing parameters not found in the first set of printing instructions.

* * * * *